United States Patent Office 3,042,700
Patented July 3, 1962

3,042,700
ORGANIC PHOSPHORUS COMPOUNDS
Gail H. Birum, Dayton, Ohio, assignor to Monsanto Chemical Company, St. Louis, Mo., a corporation of Delaware
No Drawing. Filed Oct. 16, 1959, Ser. No. 846,817
9 Claims. (Cl. 260—461)

This invention relates to organic phosphorus compounds.

An object of this invention is to provide new and useful compounds containing pentavalent phosphorus.

A more specific object is to provide a new and useful class of phosphates and phosphorothioates which contain phosphinylhydrocarbyloxy radicals.

Other objects of this invention will appear from the description hereinafter.

In copending application, S.N. 780,202, filed December 15, 1958, there are disclosed and claimed compounds of the general formula

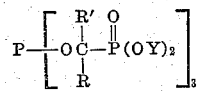

wherein R is selected from the class consisting of hydrogen and hydrocarbyl radicals which are free from aliphatic unsaturation and which contain from 1 to 8 carbon atoms, R' is selected from the class consisting of hydrogen and the methyl radical and is the methyl radical only when R has from 1 to 2 carbon atoms, and Y is selected from the class consisting of alkyl and haloalkyl radicals having from 1 to 8 carbon atoms, and a method of making them.

Those compounds can be described as tris(phosphinylhydrocarbyl) phosphites and can also be classified as phosphite-phosphonates, which description illustrates the type of phosphorus linkages which exist in the compounds.

According to this invention, there are provided compounds having the general formula $$E=P\left[-OCH\underset{R}{\overset{O}{\underset{\parallel}{-}}}\underset{Y}{\overset{\parallel}{P}}-Y\right]_3$$

wherein R is selected from the group consisting of hydrogen and hydrocarbyl radicals having from 1 to 11 carbons and each Y is selected from the group consisting of hydrocarbyl, hydrocarbyloxy, halohydrocarbyl, and halohydrocarbyloxy radicals having from 1 to 12 carbon atoms, and E is selected from the group consisting of oxygen and sulfur. These compounds can be described broadly as phosphinylhydrocarbyloxy esters of phosphoric and phosphorothioic acids. They can also be referred to as phosphate-phosphonates, phosphate-phosphinates, phosphate phosphine oxide derivatives, and their phosphorothioate counterparts, depending upon the types of phosphorus linkages which exist in the compounds. For example,

is tris[1-(diethoxyphosphinyl)ethyl] phosphate and generally referred to as a phosphate-phosphonate; whereas

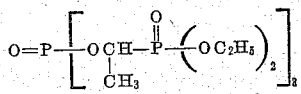

is tris[α-(phenylphenoxyphosphinyl)benzyl] phosphorothioate and is generally classified as a phosphorothioate-phosphinate; and

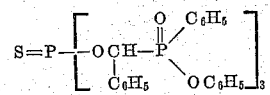

is tris[1-(dipropylphosphinyl)nonyl] phosphate and is classified in this specification as a phosphate-phosphine oxide derivative. The term "hydrocarbyl," as used in this case, is defined in Degering, An Outline of Organic Chemistry, 5th edition (1947), page 135, as follows: "Hydrocarbyl is the radical obtained by the loss of a hydrogen atom from any hydrocarbon."

These phosphinylhydrocarbyloxy esters of phosphoric and phosphorothioic acid can be prepared by oxidizing or thionating a phosphinylhydrocarbyloxy ester of phosphorous acid. For example, by contacting a phosphite-phosphonate such as tris[1-(dipropoxyphosphinyl)ethyl] phosphite with an oxidizing agent, there is produced tris[1-(dipropoxyphosphinyl)ethyl] phosphate. If this phosphite-phosphonate is treated with sulfur, the tris[1-(dipropoxyphosphinyl)ethyl] phosphorothioate is formed. In this manner, the phosphite trivalent phosphorus atom is oxidized to the pentavalent state and has an oxygen or sulfur atom attached thereto without disturbing the linkages of that phosphorus atom to the other atoms or groups of the molecule.

A few additional illustrative examples of phosphite-phosphonate compounds, i.e., those having the formula

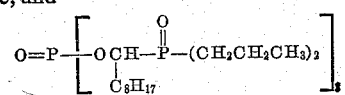

where R is as defined above and each hydro denotes a hydrocarbyl or halohydrocarbyl radical which has from 1 to 12 carbon atoms which may be oxidized and the resulting products are:

Tris[1-(dimethoxyphosphinyl)butyl] phosphite to obtain tris[1-(dimethoxyphosphinyl)butyl] phosphate,
Tris{1-[bis(2-bromoethoxy)phosphinyl]decyl} phosphite to obtain tris{1-[bis(2-bromoethoxy)phosphinyl]decyl} phosphate,
Tris[α-(dioctyloxyphosphinyl)-p-methylbenzyl] phosphite to obtain tris[α(dioctyloxyphosphinyl)-p-methylbenzyl] phosphate,
Tris[1-(phenoxyethoxyphosphinyl)dodecyl] phosphite to obtain tris[1-(phenoxyethoxyphosphinyl)dodecyl] phosphate,
Tris{α-[(2-chlorohexyloxy)amyloxyphosphinyl]naphthyl} phosphite to obtain tris{α-[(2-chlorohexyloxy)amyloxyphosphinyl]naphthyl} phosphate,
Tris{1-[(p-bromophenoxy)-p-methylphenoxyphosphinyl]methyl} phosphite to obtain tris{1-[(p-bromophenoxy)-p-methylphenoxyphosphinyl]methyl} phosphate,
Tris{1-[(4-chlorophenoxy)-2-chloropropoxyphosphinyl]amyl}phosphite to obtain tris{1-[(4-chlorophenoxy)-2-chloropropoxyphosphinyl]amyl} phosphate.
Tris{1-[(2-chloropropoxy)phenoxyphosphinyl]-2-ethylhexyl} phosphite to obtain tris{1-[(2-chloropropoxy)phenoxyphosphinyl]-2-ethylhexyl} phosphate,
Tris{α-[(2-fluoro-4-ethylphenoxy)-3-phenylpropoxyphosphinyl]benzyl} phosphite to obtain tris{α-[2-fluoro-4-ethylphenoxy)-3-phenylpropoxyphosphinyl]benzyl} phosphate, and
Tris[1-(diallyloxyphosphinyl)octyl] phosphite to obtain tris[1-(diallyloxyphosphinyl)octyl] phosphate.

When a phosphite-phosphonate of the above general type is treated with sulfur, the respective phosphorothioate-phosphonate compounds are produced, examples of which are:

Tris[1-(diethoxyphosphinyl)propyl] phosphite to obtain tris[1-(diethoxyphosphinyl)propyl] phosphorothioate, Tris{α-[bis(2-chloroethoxy)phosphinyl]benzyl} phosphite to obtain tris{α-[bis(2-chloroethoxy)phosphinyl]benzyl} phosphorothioate, Tris[1-(propoxyphenoxyphosphinyl)heptyl] phosphite to obtain tris[1 - (propoxyphenoxyphosphinyl)heptyl] phosphorothioate, Tris{α - [(3 - bromo - 2 - chloropropoxy)phenoxyphosphinyl]-β-methylnaphthyl} phosphite to obtain tris{α-[(3 - bromo - 2 - chloropropoxy)phenoxyphosphinyl] - β-methylnaphthyl} phosphorothioate, Tris[1-(diphenoxyphosphinyl)hexyl] phosphite to obtain tris[1-(diphenoxyphosphinyl)hexyl] phosphorothioate, Tris{1 - [(2-chloropropoxy)(2-chloroethoxy)phosphinyl]-2-propenyl} phosphite to obtain tris{1-[(2-chloropropoxy)(2-chloroethoxy)phosphinyl]-2-propenyl} phosphorothioate, Tris{α - [(p - fluorophenoxy)ethoxyphosphinyl]-3,4-dimethylbenzyl} phosphite to obtain tris{α-[(p-fluorophenoxy)ethoxyphosphinyl] - 3,4 - dimethylbenzyl} phosphorothioate, Tris[1 - (dodecyloxydecyloxyphosphinyl) - 4-pentynyl] phosphite to obtain tris[1-(dodecyloxydecyloxyphosphinyl)-4-pentynyl] phosphorothioate, Tris[1-(dimethoxyphosphinyl)propyl] phosphite to obtain tris[1-(dimethoxyphosphinyl)propyl] phosphorothioate, and Tris{α - [bis(3 - hexenyloxy)phosphinyl]benzyl} phosphite to obtain tris{α-[bis(3-hexenyloxy)phosphinyl]benzyl} phosphorothioate.

Oxidation or thionation of a phosphite-phosphinate compound of the type

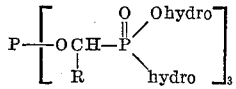

wherein R is as defined above and hydro is selected from the group consisting of hydrocarbyl and halohydrocarbyl radicals having from 1 to 12 carbon atoms results in the formation of the respective phosphate-phosphinate or phosphorothioate-phosphinate compounds. Examples of such compounds when an oxidizing agent is used as:

Tris[1-(methoxyethylphosphinyl)propyl] phosphite to obtain tris[1 - (methoxyethylphosphinyl)propyl] phosphate, Tris[1 - (phenoxyhexylphosphinyl) - 4-hexenyl] phosphite to obtain tris[1-(phenoxyhexylphosphinyl)-4-hexenyl] phosphate, Tris{1-[(2- chlorocyclohexyloxy)ethylphosphinyl]heptyl} phosphite to obtain tris{1-[(2-chlorocyclohexyloxy)ethylphosphinyl]heptyl} phosphate, Tris{α - [(2 - chloroisopropoxy) - p-tolylphosphinyl]-4-methylbenzyl} phosphite to obtain tris{α-[(2-chloroisopropoxy)-p-tolylphosphinyl]-4-methylbenzyl} phosphate, Tris{1 - [hexyl(4-octenyloxy)phosphinyl]decyl} phosphite to obtain tris{1-[hexyl(4-octenyloxy)phosphinyl]decyl} phosphate, and Tris{1 - [(4 - bromophenoxy)butylphosphinyl]-2-phenyl-2-propenyl} phosphite to obtain tris{1-[(4-bromophenoxy)butylphosphinyl] - 2 - phenyl-2-propenyl} phosphate.

Examples of products obtained when phosphate-phosphinates of the above general type are treated with sulfur are:

Tris[1-(ethoxyphenylphosphinyl)butyl] phosphite to obtain tris[1-(ethoxyphenylphosphinyl)butyl] phosphorothioate, Tris{α - [(2 - chloropropoxy)propylphosphinyl]benzyl} phosphite to obtain tris{α[(2-chloropropoxy)propylphosphinyl]benzyl} phosphorothioate, Tris{1 - [(4 - phenylbutoxy)octylphosphinyl] - 10 - undecenyl} phosphite to obtain tris{1-[(4-phenylbutoxy)octylphosphinyl]-10-undecenyl} phosphorothioate, Tris{1-[(5-dodecynyl)propoxyphosphinyl]ethyl} phosphite to obtain tris{1-[(5-dodecynyl)propoxyphosphinyl]ethyl} phosphorothioate, and Tris[1-(undecyloxyphenylphosphinyl)octyl] phosphite to obtain tris[1 - (undecyloxyphenylphosphinyl)octyl] phosphorothioate.

Compounds of the formula

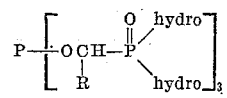

i.e., a phosphite-phosphine oxide derivative, where R is as above defined, and each hydro denotes a member selected from the group consisting of hydrocarbyl and halohydrocarbyl radicals having from 1 to 12 carbon atoms, can also be oxidized or thionated to produce the respective phosphates or thiophosphates. A few examples of compounds prepared when an oxidizing agent is used are:

Tris[1-(diethylphosphinyl)ethyl] phosphite to obtain tris[1-(diethylphosphinyl)ethyl] phosphate, Tris[α-(dipropylphosphinyl)benzyl] phosphite to obtain tris[α-(dipropylphosphinyl)benzyl] phosphate, Tris[1-(diphenylphosphinyl)-3-butenyl] phosphite to obtain tris[1-(diphenylphosphinyl)-3-butenyl] phosphate, Tris{1-[(phenyl)ethylphosphinyl]hexyl} phosphite to obtain tris{1-[(phenyl)ethylphosphinyl]hexyl} phosphate, Tris{α - [(2 - ethylhexyl)(4-methylphenyl)phosphinyl]amyl} phosphite to obtain tris{α-[(2-ethylhexyl)(4-methylphenyl)phosphinyl]amyl} phosphate, and Tris{α - [bis(2 - chloro - 4 - heptenyl)phosphinyl] - 4-methylbenzyl} phosphite to obtain tris{α-[bis(2-chloro-4-heptenyl)phosphinyl]-4-methylbenzyl} phosphate.

When sulfur is used the respective phosphorothioate-phosphine oxide derivatives are formed, examples of which are:

Tris[1-(ethylmethylphosphinyl)ethyl] phosphite to obtain tris[1-(ethylmethylphosphinyl)ethyl] phosphorothioate, Tris[α-(di-p-tolylphosphinyl)benzyl] phosphite to obtain tris[α-(di-p-tolylphosphinyl)benzyl] phosphorothioate, Tris[1-(dipropylphosphinyl)decyl] phosphite to obtain tris[1-(dipropylphosphinyl)decyl] phosphorothioate, Tris{1-[(5-hexenyl)methylphosphinyl]butyl} phosphite to obtain tris{1-[(5-hexenyl)methylphosphinyl]butyl} phosphorothioate, Tris[1-(diethylphosphinyl)-3-propynyl] phosphite to obtain tris[1-(diethylphosphinyl)-3-propynyl] phosphorothioate, and Tris[1 - (diisoamylphosphinyl)-2-methylpropyl] phosphite to obtain tris[1-(diisoamylphosphinyl)-2-methylpropyl] phosphorothioate.

I have found that a wide variety of oxidizing agents convert the trivalent phosphorus atom of the phosphinylhydrocarbyloxy phosphites to the pentavalent state and supply an oxygen atom thereto without disturbing the linkages of that phosphorus atom to the other groups of the molecule. Some of those oxidizing agents which are preferred for use in making the compounds of this invention are the peroxycarboxylic acids, both aromatic and aliphatic, hydroperoxides, hydrogen peroxide, ozone, oxygen, and nitrogen oxides such as nitrogen tetroxide. Air may be used but it is not preferred. Although the more common inorganic oxidizing agents, such as KMnO$_4$, CrO$_3$, etc., would accomplish the oxidation, they are not desirable for reasons of expense, salt by-product complications, etc. To prepare the phosphinylhydrocarbyloxy phosphorothioates of this invention, elemental sulfur is preferably used.

In either case, i.e., whether the phosphate or phosphorothioate products are being prepared the respective phosphite-phosphonate, phosphite-phosphinate, or phosphite-phosphine oxide derivative is usually contacted with a stoichiometric amount or slight excess of oxidizing agent or sulfur and warming, when necessary, to insure complete reaction. Any excess oxidizing agent or sulfur can easily be removed by known physical means, e.g., filtration, volatilization, extraction, etc.

Reaction of the respective phosphinylhydrocarbyloxy phosphites and the oxidizing agent or sulfur can take place at room temperature. However, when using the highly reactive oxidizing agents, it is often preferred to cool the mixture, generally to between −70° and 20° C., depending upon which reactants are combined, to control the resulting exothermic reaction. On the other hand, the reaction of the respective phosphinylhydrocarbyloxy phosphites and sulfur mixtures is usually most practically accomplished by warming the mixture to from 50° C. to 100° C. to initiate the reaction and then to a higher temperature of the order of from 100° C. to 140° C. to insure that sulfur addition is complete.

The respective phosphinylhydrocarbyloxy phosphites are readily oxidized or thionated in the absence of an inert diluent, solvent, or catalyst. However diluents, or solvents and catalysts may be employed. The use of diluents or solvents may be particularly advantageous when working with the highly active oxidizing agents or the more viscous tris(phosphinylhydrocarbyloxy) phosphites. Such diluents or solvents are, e.g., benzene, toluene, xylene, alkylene halides such as methylene chloride and methylene bromide, hexane, and mixtures thereof. Although no particular order of contacting the oxidizing agent or sulfur with the tris(phosphinylhydrocarbyloxy) phosphites need be employed, it is preferred to add the oxidizing agent or sulfur portionwise to the tris(phosphinylhydrocarbyloxy) phosphites to avoid unduly exothermic reactions and waste of reactants.

The phosphinylhydrocarbyloxy phosphates and phosphorothioates of this invention are stable, usually high boiling materials which range from viscoid liquids to waxy or crystalline solids. They are useful as plasticizers, functional fluids and dielectrics. They are useful biological toxicants in quantities ranging from 1 to 10 parts per million up to 10,000 parts per million, depending upon the organism being treated. They are useful as lead scavengers in leaded gasolines, the quantity used depending upon the amount of lead in the gasoline but generally ranging from 0.05 to 10.0 moles per mole of lead present. They are useful as fire-retardant additives in quantities ranging from 0.5% to 10% or more by weight in many polymeric materials such as urea-formaldehyde, phenol-formaldehyde, epoxy, and other oxygen containing resins, in polyester type compositions such as polyterephthalate, polyacrylonitrile, and polyamide polymers and condensation products used to make fibers, in urethane, styrene, and other foam materials, in rubber based emulsion type coatings as well as in cellulosic and hydrocarbon materials. They are also useful as gear and lubricant oil and grease additives.

Those of the presently prepared compounds which are gasoline soluble are particularly useful as stable preignition additives for leaded gasolines. The invention thus provides an improved fuel for spark ignition internal combustion engines which consists essentially of gasoline, an organo-lead antiknock, and a tris(phosphinylhydrocarbyloxy) phosphate or phosphorothioate product of this invention, said product being present in said fuel in a quantity sufficient to suppress preignition of the fuel.

Preignition is the ignition of the combustible mixture of air and fuel prior to firing by the spark plug. This occurs when deposits of readily glowing material build up in the combustion chamber. When the fuel is a gasoline containing an organo-lead antiknock together with a halohydrocarbon scavenger, such readily glowing deposits comprise carbon in a mixture with lead halides; the latter acting to reduce the normal ignition temperature of carbon. Since reduction of the ignition temperature tends to increase with increasing concentration of the organo-lead antiknock, preignition is a problem which becomes particularly troublesome as use of high compression engines become more prevalent. The deposits of carbon and lead salts retain sufficient heat from the previous firing cycle in enough quantity to permit them to glow, and if the glowing period (which depends upon ease of ignition, and hence the lead content of the deposit) is long enough, the fuel fires in the next cycle before it can be fired by the spark plug. The erratic firing which thus results is demonstrated by a "wild ping" or a dull, thudding knock. It is generally accompanied by increasing detonation, spark plug fouling, and reduction of exhaust valve life.

It has now been found that preignition and the various difficulties consequent thereto can be substantially suppressed or entirely eliminated by incorporating the gasoline-soluble tris(phosphinylhydrocarbyloxy) phosphate or phosphorothioate into the leaded gasoline in a preignition-inhibiting quantity. Such a quantity, of course, will depend upon the content of the organo-lead compound and halohydrocarbon scavenger in the fuel. Lead gasolines usually contain an antiknocking quantity of an organo-lead compound such as tetraethyllead, tetramethyllead, dimethyldiethyllead, and tetraphenyllead and substantially the amount of hydrocarbon halide scavenger, say, ethylene dibromide, ethylene dichloride, acetylene tetrabromide, or mono- or poly-halopropane, butane, or pentane, or polyhaloalkyl benzene, which is calculated to react with the organo-lead compound to give a lead halide, e.g., lead bromide when the organo-lead compound is tetraethyllead and the halohydrocarbon is ethylene dibromide. The quantity of the tris(phosphinylhydrocarbyloxy) phosphate or phosphorothioate which will suppress preignition of the leaded hydrocarbon fuel will depend upon the quantity of lead present in the fuel.

The invention is further illustrated by, but not limited to, the following examples:

*Example 1*

A reaction flask equipped with a stirrer having a gas dispersion inlet, a Dry Ice condenser, and a thermometer was charged with 17.5 g. of tris [α-(dihexyloxyphosphinyl)benzyl] phosphite in 30 ml. of methylene chloride. This was cooled to −20° C. and then a stream of oxygen-ozone was passed into the mixture. The rate of ozone output was 38 mg. per liter of oxygen-ozone mixture. The reaction was carried out at −10° C. to −30° C. At the end of 15 minutes no more ozone was being absorbed as indicated by the ozone meter. The mixture was allowed to warm to room temperature and then purged with nitrogen to remove dissolved unreacted ozone. The mixture was transferred to a distilling flask and the solvent removed under vacuum. The residue was concentrated to 100° C./0.15 mm. to obtain 17 g. of tris[α-dihexyloxyphosphinyl)benzyl] phosphate. Nuclear magnetic resonance measurements on this product showed a characteristic chemical shift of −17 p.p.m. (relative to $H_3PO_4$) for the phosphonate phosphorus and a characteristic shift of 0 p.p.m. for the phosphate phosphorus.

*Example 2*

A mixture consisting of 46.4 g. (0.042 mole) of tris[α-(dihexyloxyphosphinyl)benzyl] phosphite and 1.0 g. of sulfur was stirred and warmed to 125° C. All the sulfur present had reacted so 0.2 g. more was added and warming was continued to 130° C. In this manner there was obtained 47.7 g. of clear, colorless tris[α-(dihexyloxyphosphinyl)benzyl] phosphorothioate.

*Example 3*

Sulfur (1.8 g.) was added to 66.8 g. (0.109 mole) of tris[1-(diethoxyphosphinyl)-2-propenyl] phosphite, and the mixture was stirred and warmed to 110° C. All the sulfur had reacted at this temperature so 0.7 g. more was added and heating was resumed until the temperature reached 120° C. There was thus obtained 69.2 g. of viscous tris[1-(diethoxyphosphinyl)-2-propenyl] phosphorothioate.

Example 4

Sulfur (0.5 g.) was added at room temperature to 11.8 g. (0.017 mole) of tris[1-(phenylethoxyphosphinyl)ethyl] phosphite in 15 ml. of toluene and the mixture was warmed and stirred. By the time the temperature of the mixture reached 120° C., all of the sulfur had reacted. There was thus obtained a toluene solution of tris[1-(phenylethoxyphosphinyl)ethyl] phosphorothioate.

Tris[1-(dihydrocarbylphosphinyl)hydrocarbyl] phosphites react in the same way with an oxidizing agent or sulfur to give tris[1-(dihydrocarbylphosphinyl)hydrocarbyl] phosphates and phosphorothioates, respectively.

Example 5

To 43.1 g. (0.0525 mole) of tris{1-[bis(2-chloroethoxyphosphinyl]propyl} phosphite there was added 1.3 g. of sulfur and the resulting mixture was stirred at room temperature for 15 minutes and then heated gradually to 153° C. while stirring. There was thus obtained a very viscous liquid product, tris{1-[bis(2-chloroethoxy)phosphinyl]propyl} phosphorothioate.

Example 6

This example illustrates the utility of the presently described compounds as preignition additives for leaded gasolines.

Since it has been established that there is a close relationship between the quantity of a material required to suppress glowing and the effectiveness of the same material for reducing preignition of a leaded fuel in gasoline engines, testing of the presently prepared phosphorus compounds was conducted by a glow test method wherein the following procedure was employed:

Test blends were prepared by blending (1) 5 ml. of a fuel consisting of a high-boiling (380–420° F.) hydrocarbon fraction containing approximately 136 mg. of lead based on the quantity of commercial tetraethyllead-halohydrocarbon additive (hereinafter referred to as TEL) which had been incorporated therein and 1 ml. of an SAE 30 grade lubricating oil with (2) graduated, precisely weighed quantities of one of the phosphorus compounds to be tested, said quantities being in the range of 0.01 to 2.0 times the quantity of lead present. Two ml. of the test blend was then dropped at a constant rate (1.5±0.1 ml./15 minutes) during a 15–17 minute period, into a reagent grade decolorizing carbon contained in a crucible maintained in a furnace at a temperature which was high enough to keep the bottom of the crucible at about 1000° F. By using test blends containing progressively lower quantities of the test compound, there was determined the minimum concentration of the test compound at which no glowing was evidenced either during the dropping period or after all of the test sample had been added. Under these conditions, a "control" sample, i.e., one which contained all of the constituents of the test blend except the phosphorus compound to be tested caused the carbon to glow throughout the addition thereof and after addition had been completed. Tricresyl phosphate, TCP, a commercial additive was tested according to this method. No glowing was observed when there was present in the test blend 0.0492 g. of TCP per 5 ml. of said fuel blend. On the other hand, no glowing was observed when there was present in the test blend 0.0369 g. of O,O,O-tris[α(dihexyloxyphosphinyl)benzyl] phosphorothioate, which had been prepared as described above.

Instead of the tris(phosphinylhydrocarbyloxy) phosphorothioate products, there may be used for the purpose of effectively inhibiting preignition of leaded fuels, any of the gasoline-soluble trivalent phosphorus free products described above. While, as will be obvious to those skilled in the art, the compound to be useful must be present in the gasoline in soluble form, it will also be realized that since the additive is employed in only very low concentrations, gasoline solubility at the presently useful concentrations is possessed by the great preponderance of the presently prepared compounds. Whether the trivalent phosphorus-free product is soluble in the gasoline at the effective concentration can be readily ascertained by routine experimentation.

Inasmuch as the crude reaction mixture obtained by the method used comprises an aliphatic halohydrocarbon as by-product, the latter obviously can serve conveniently as the lead scavenger in leaded gasoline fuels containing the presently provided tris(phosphinylhydrocarbyloxy) phosphates and phosphorothioates.

Leaded gasolines containing the presently prepared compounds are compatible with other additives customarily used in the art, e.g., rust inhibitors, stabilizers or antioxidants, dyes, etc. The tris(phosphinylhydrocarbyloxy) phosphates and phosphorothioates of this invention may be employed in different proportions than specifically shown and with such other additives and adjuvants.

I claim:

1. Compounds of the formula

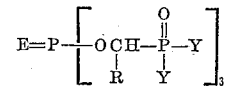

wherein R is selected from the group consisting of hydrogen and hydrocarbyl radicals having from 1 to 11 carbon atoms, and each Y is selected from the group consisting of hydrocarbyl, hydrocarbyloxy, halohydrocarbyl, and halohydrocarbyloxy radicals which have from 1 to 12 carbon atoms, and E is selected from the group consisting of oxygen and sulfur.

2. Compounds of the formula

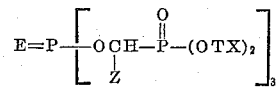

wherein Z is an aliphatic hydrocarbyl radical having from 1 to 11 carbon atoms, TX denotes halohydrocarbyl radical having from 1 to 12 carbon atoms, and E is selected from the group consisting of oxygen and sulfur.

3. Compounds of the formula

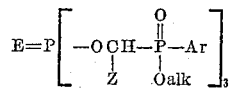

wherein Z is an aliphatic hydrocarbyl radical having from 1 to 11 carbon atoms, Ar denotes an aromatic hydrocarbyl radical having from 6 to 12 carbon atoms, and alk denotes alkyl radical having from 1 to 12 carbon atoms.

4. Tris[α-(dihexyloxyphosphinyl)benzyl] phosphate.

5. Tris[1-(phenylethoxyphosphinyl)ethyl] phosphorothioate.

6. Tris{1-[bis(2-chloroethoxy)phosphinyl]propyl} phosphorothioate.

7. Tris[α-(dihexyloxyphosphinyl)benzyl] phosphorothioate.

8. Tris[1-(diethoxyphosphinyl)-2-propenyl] phosphorothioate.

9. Compounds of the formula

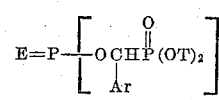

wherein Ar is an aromatic hydrocarbyl radical having from 6 to 12 carbon atoms, T denotes an aliphatic hydrocarbyl radical having from 1 to 12 carbon atoms, and E is selected from group consisting of oxygen and sulfur.

References Cited in the file of this patent

UNITED STATES PATENTS

| 2,857,415 | Birum | Oct. 21, 1958 |
| 2,892,691 | Howell | June 30, 1959 |
| 2,897,071 | Gilbert | July 28, 1959 |
| 2,897,228 | Scott et al. | July 28, 1959 |